Figure 1:
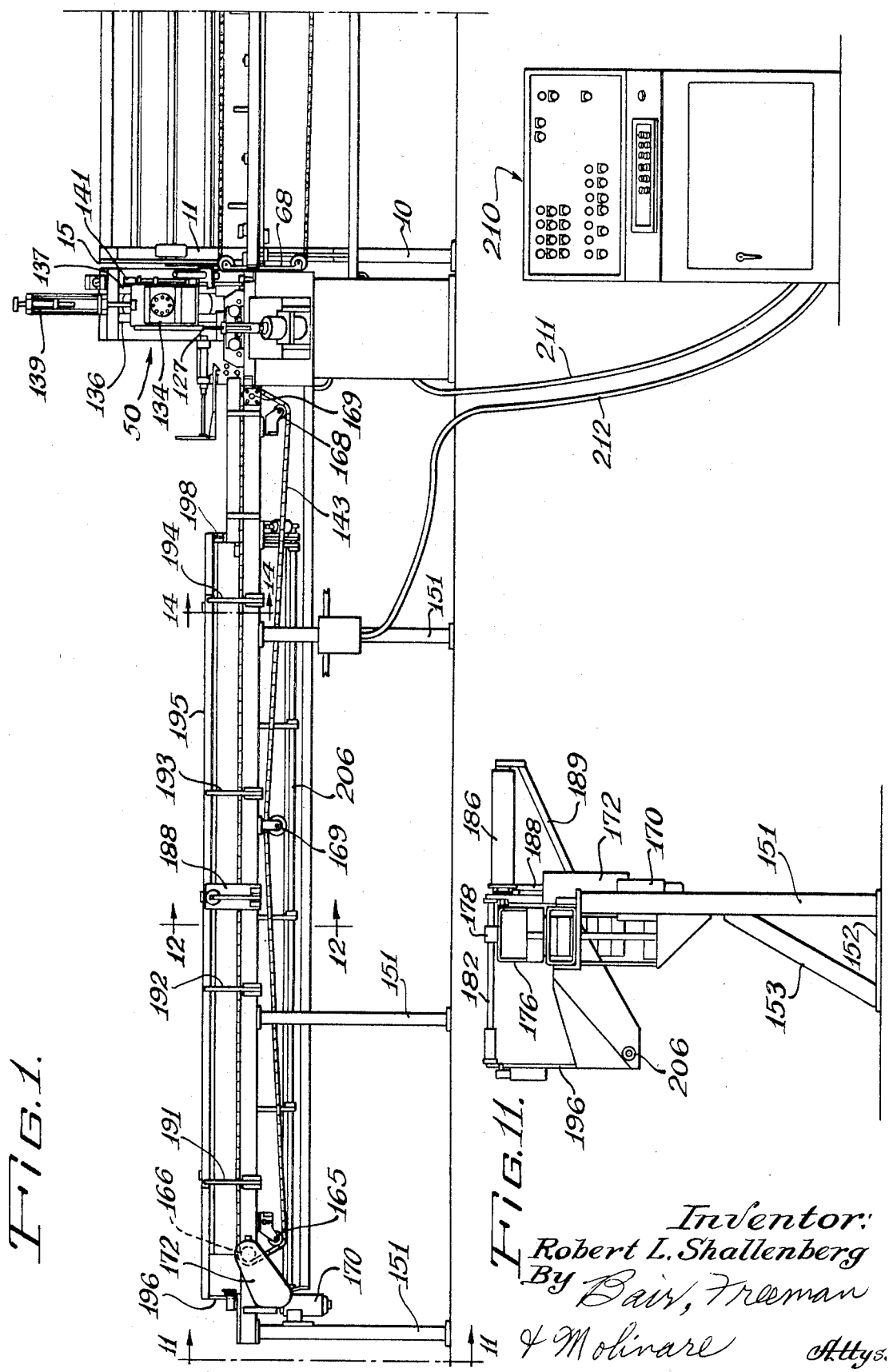

United States Patent

[11] 3,522,750

| [72] | Inventor: | Robert L. Shallenberg<br>Wheaton, Illinois |
|------|-----------|---------------------------------------------|
| [21] | Application No.: | 683,937 |
| [22] | Filed: | Nov. 17, 1967 |
| [45] | Patented: | Aug. 4, 1970 |
| [73] | Assignee: | Servicemaster Industrial Systems Company<br>a Corp. of Illinois |

[54] AUTOMATIC CUTTING MACHINE
49 Claims, Drawing Figs.

[52] U.S. Cl. .................................................. 83/82,
83/153, 83/207, 83/210, 83/222, 83/281, 83/282, 83/365, 83/449
[51] Int. Cl. ................................................... B26d 5/20, B26d 7/06
[50] Field of Search ........................................ 83/81, 82, 153, 222, 276, 281, 365, 278, 282, 207, 209, 210, 367, 417, 437, 461, 466, 470, 449

[56] References Cited
UNITED STATES PATENTS

| 426,487 | 4/1890 | Aiken | 83/449X |
|---------|--------|-------|---------|
| 3,072,003 | 1/1963 | Sirugue | 83/396X |
| 3,244,047 | 4/1966 | Daniluk | 83/367X |
| 3,426,631 | 2/1969 | Sandberg | 83/82 |

Primary Examiner— Andrew R. Juhasz
Assistant Examiner— James F. Coan
Attorney—Allegretti, Newitt & Witcoff ABSTRACT: A cut off machine for pipes, rods and the like where any elongated work pieces are fed singly or in multiples from a storage rack to a frame provided with fixed and adjustable guides arranged to hold the work pieces against the fixed guides and are fed along the frame to cutting means by a pusher device. The feed rate is reduced and a brake is applied to the work pieces shortly before they reach the desired position for cutting, and the feed is then stopped and the work piece cut under the control of a controller which is responsive to movement of the pusher. The cut pieces are pulled from the cutter to a conveyor from which they are discharged laterally with a selector gate being provided to direct cut pieces and short ends into separate areas.

Inventor:
Robert L. Shallenberg
By Bair, Freeman & Molinare
Attys.

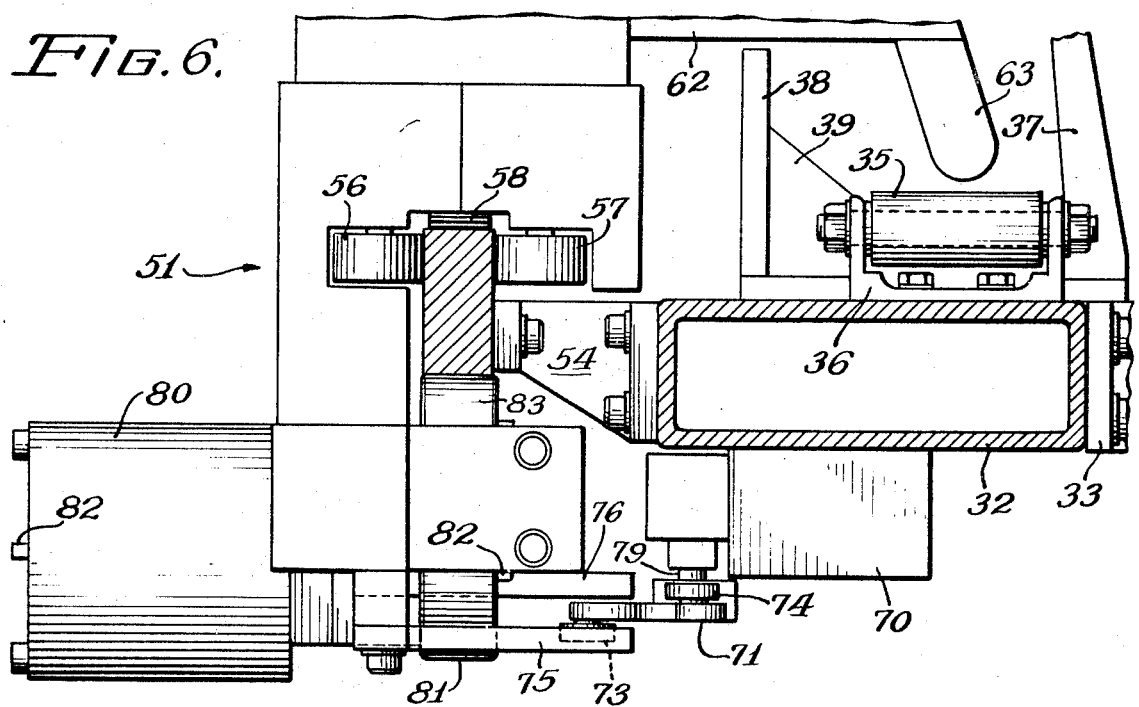
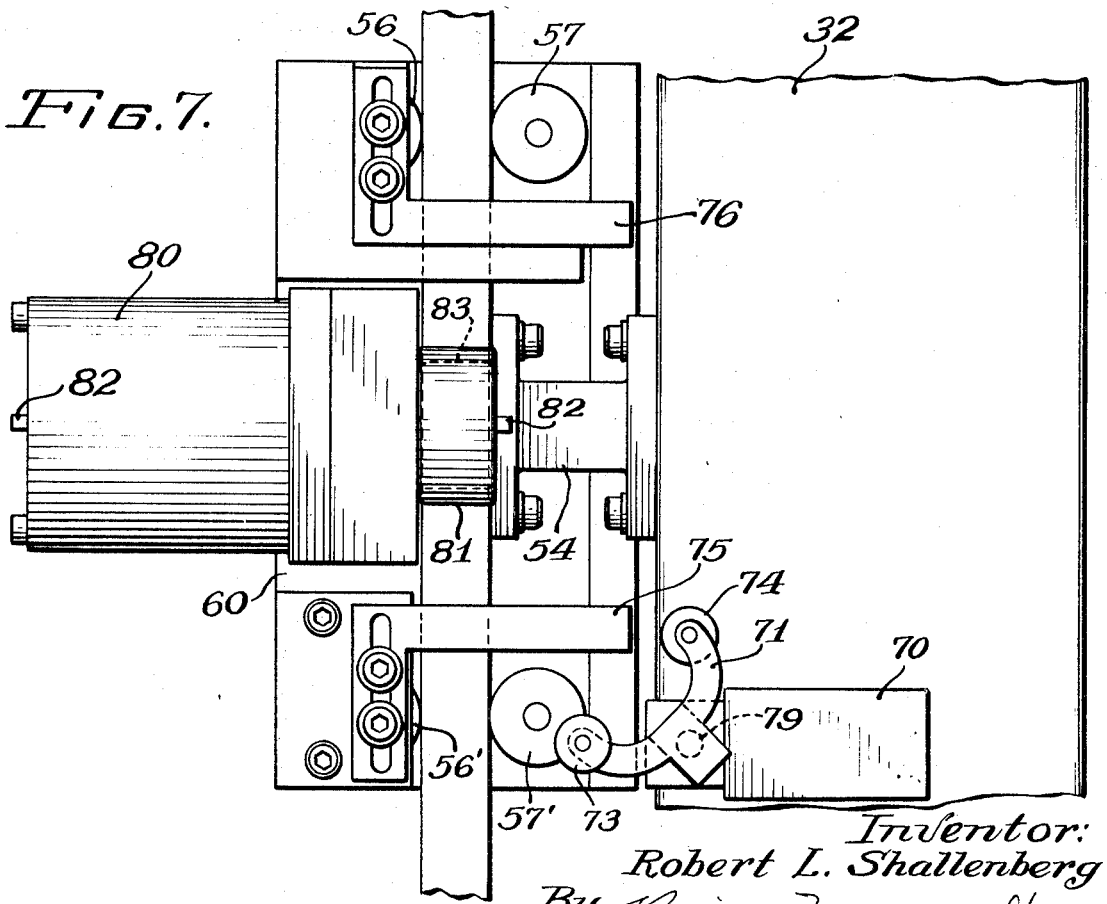

Inventor:
Robert L. Shallenberg
By Bair, Freeman & Molinare Attys.

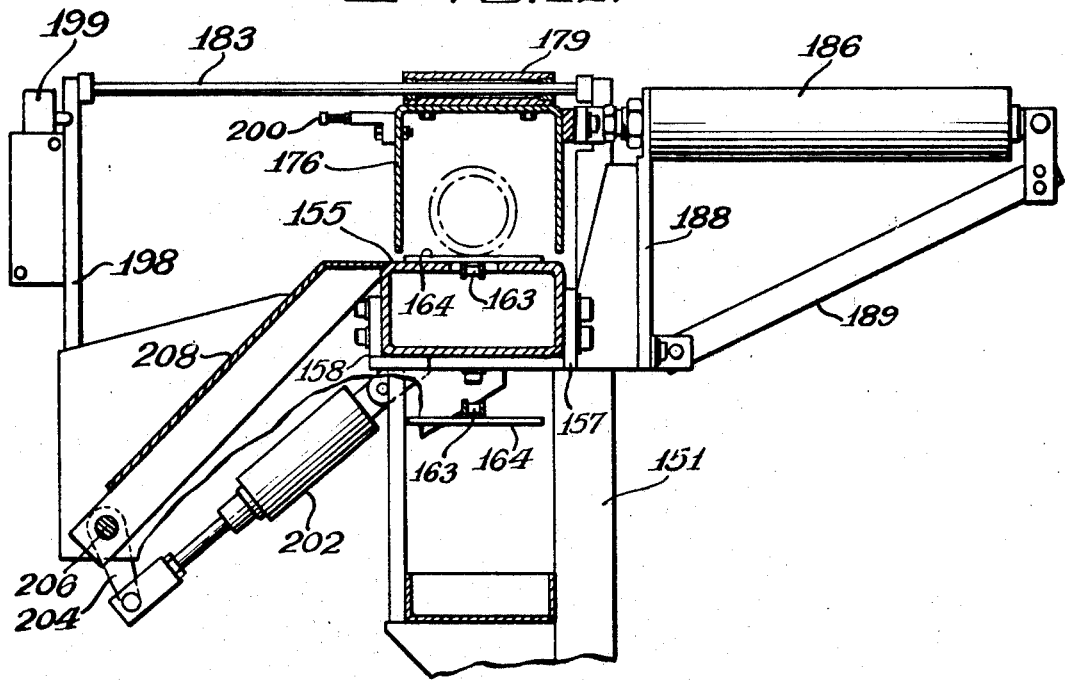
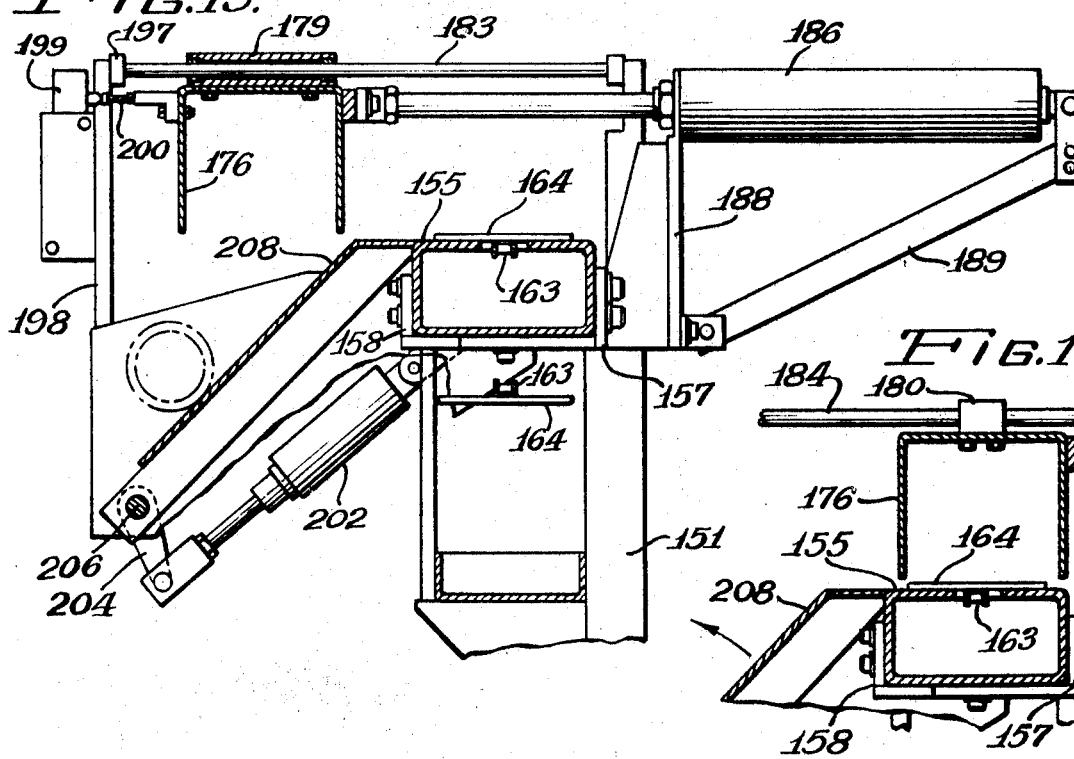

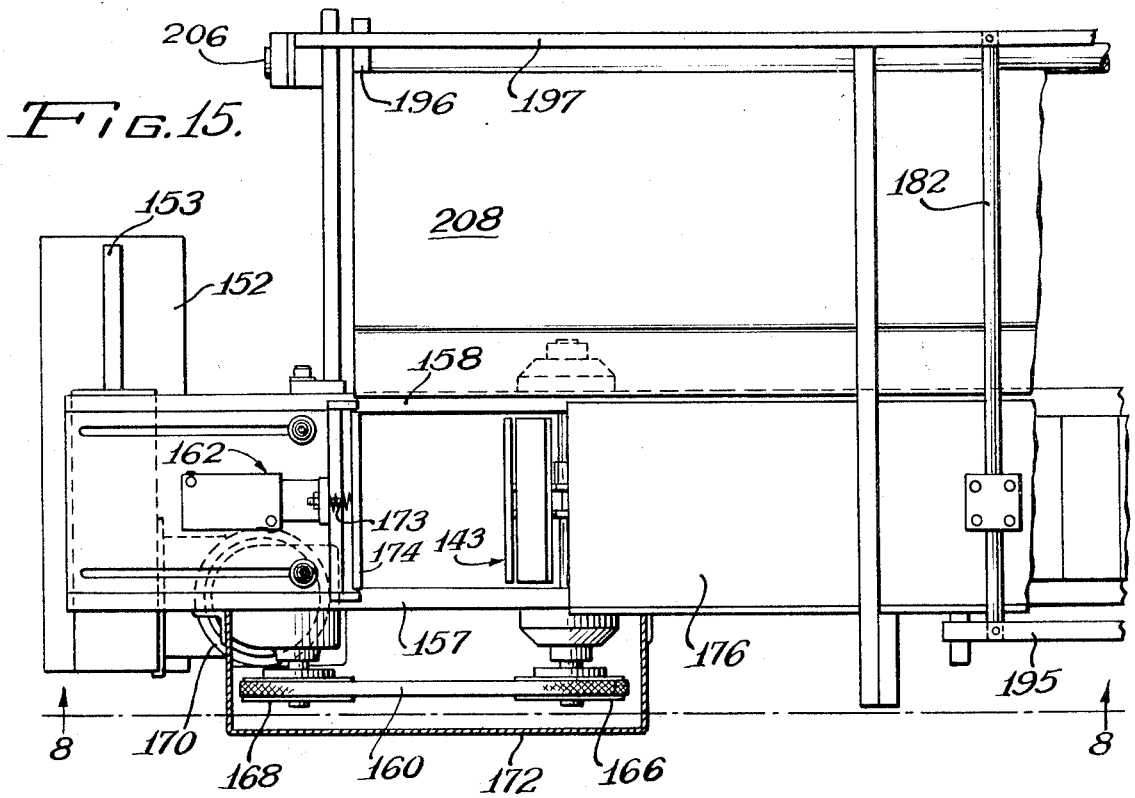
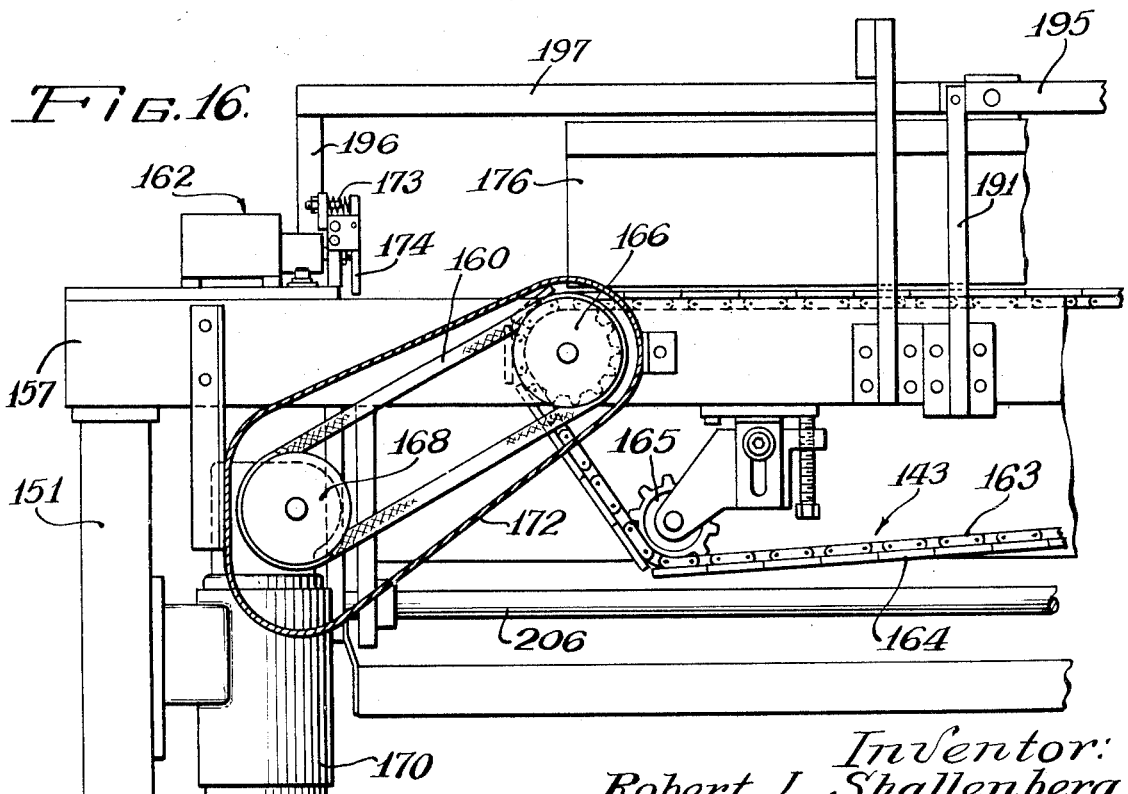

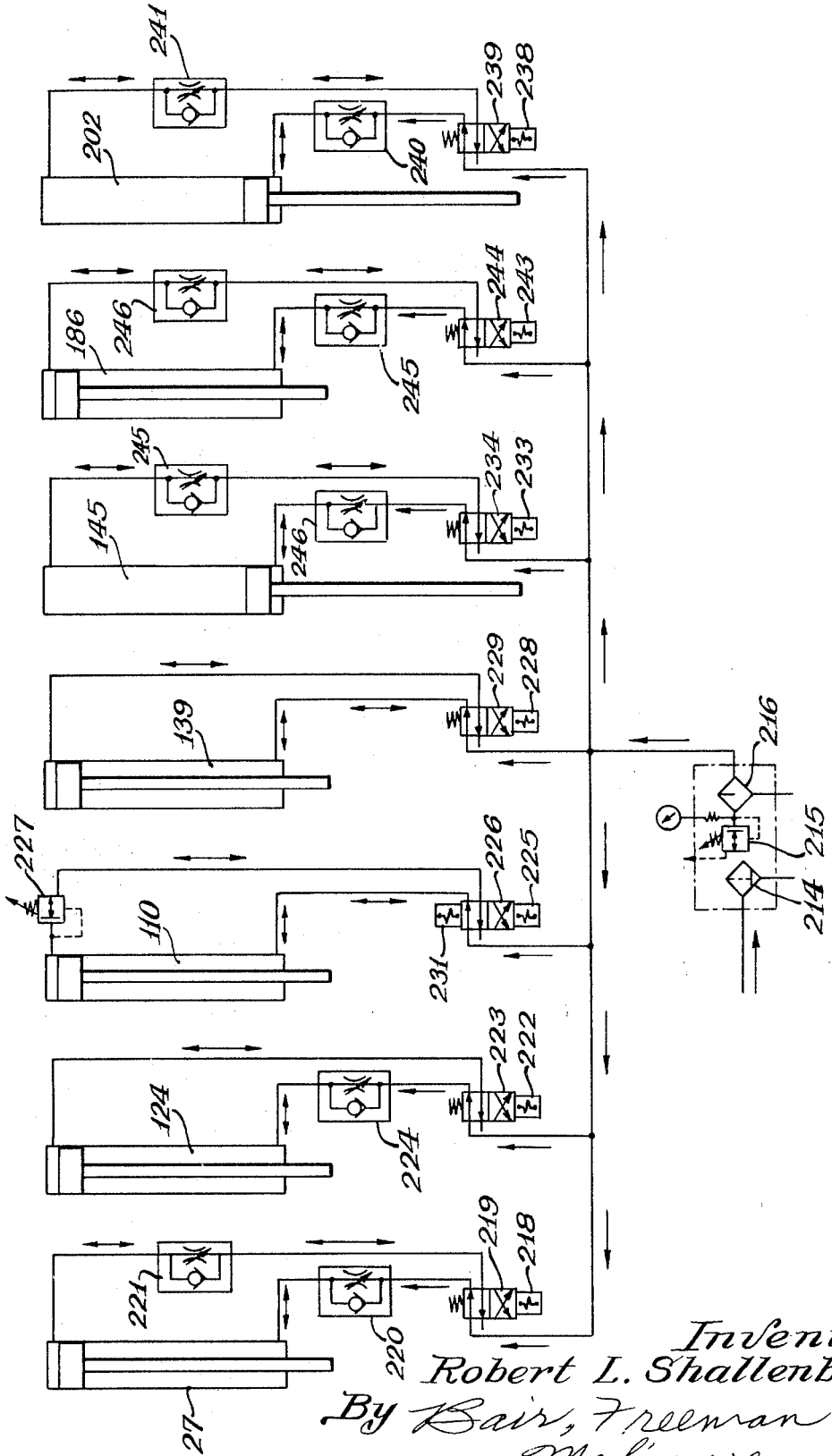

U.S. PATENT 3,522,750
AUTOMATIC CUTTING MACHINE

This invention relates to automatic cutting machines, and more particularly to a machine for automatically cutting elongated work pieces such as pipes, rods, structural shapes and the like accurately into predetermined lengths.

In many types of operations it is necessary to cut elongated work pieces accurately to length and with accurately squared ends. With cutting machines as heretofore constructed wherein the work piece is normally fed against a mechanical stop and then clamped and cut, it has not been possible to achieve the necessary degree of accuracy, either in length of the cut piece or in squareness of the end.

It is accordingly one of the objects of the present invention to provide an automatic cutting machine in which a work piece is fed accurately to cutting position under the control of a controller which is responsive to movement of the work piece feeding means. Preferably the rate of feed is reduced and a brake is applied to the work piece a short distance before it reaches cutting position so that when the feeding means is stopped the work piece will be positioned for cutting with an extremely high degree of accuracy.

Another object is to provide an automatic cutting machine in which the work piece is held against fixed guide members during feeding, and the guide members are accurately aligned with a fixed clamp jaw which cooperates with a movable clamp jaw to hold the work piece during cutting so that the work piece will be accurately aligned and will be cut squarely. The brake preferably presses the work piece to a predetermined position relative to the fixed clamp jaw to assist in maintaining the desired alignment. Two pairs of clamp jaws are preferably provided to clamp the work piece on opposite sides of the cutting position thereby to insure that it will be held squarely during the cutting operation.

Still another object is to provide an automatic cutting machine in which a new work piece is pre-cut at its leading end to provide a smooth square end thereon before cut pieces are cut therefrom. For this purpose the end of a work piece moving toward cutting position is sensed when it is a predetermined distance from the cutting position and is then moved a predetermined distance sufficient to bring its leading end slightly beyond the cutting position.

A further object is to provide an automatic cutting machine in which cut pieces are automatically removed from the cutting position to a conveyor which carries them to a desired point of disposal. The cut pieces are preferably discharged laterally from the conveyor to a bin, or the like, where they are accumulated for use or further processing.

According to a feature of the invention, short ends of the work pieces are also discharged laterally from the conveyor by the same discharge mechanism which discharges the cut pieces and a movable gate is provided to direct the short ends to a different location than the cut pieces.

The complete mechanism comprises a storage rack for receiving and holding a number of elongated work pieces such as pipes, rods, structural shapes or the like, which are removed singly from the storage rack and transferred to a guiding frame along which they are fed to a cutting means by a pusher. When the leading end of a work piece is a predetermined distance from the cutting means, its position is sensed and a controller is signaled to advance the work piece a further predetermined distance sufficient just to bring its leading end beyond the cutting means. At this time the controller stops the feeding of the work piece and causes the cutting means to operate to cut off the leading end of the work piece smoothly and squarely. After the initial cut, the controller causes the feeding means to advance the work piece a distance equal to the desired length of a cut piece plus blade width and again causes the feeding means to stop and the cutting means to operate to cut off the work piece. This operation continues under the control of the controller until the work piece has been cut into the maximum number of cut pieces which its length will accommodate.

As the pieces are cut from the work piece they are moved from the cutting position onto a discharge conveyor by a discharge device. The cut pieces are guided on the conveyor until they reach a desired discharge point at which time they are pushed laterally from the conveyor and are guided into a bin, a vat or the like. Short ends left on the work pieces after the desired pieces are cut therefrom, are carried by the same conveyor and are directed into a different collecting area by a movable gate.

Figure 2:
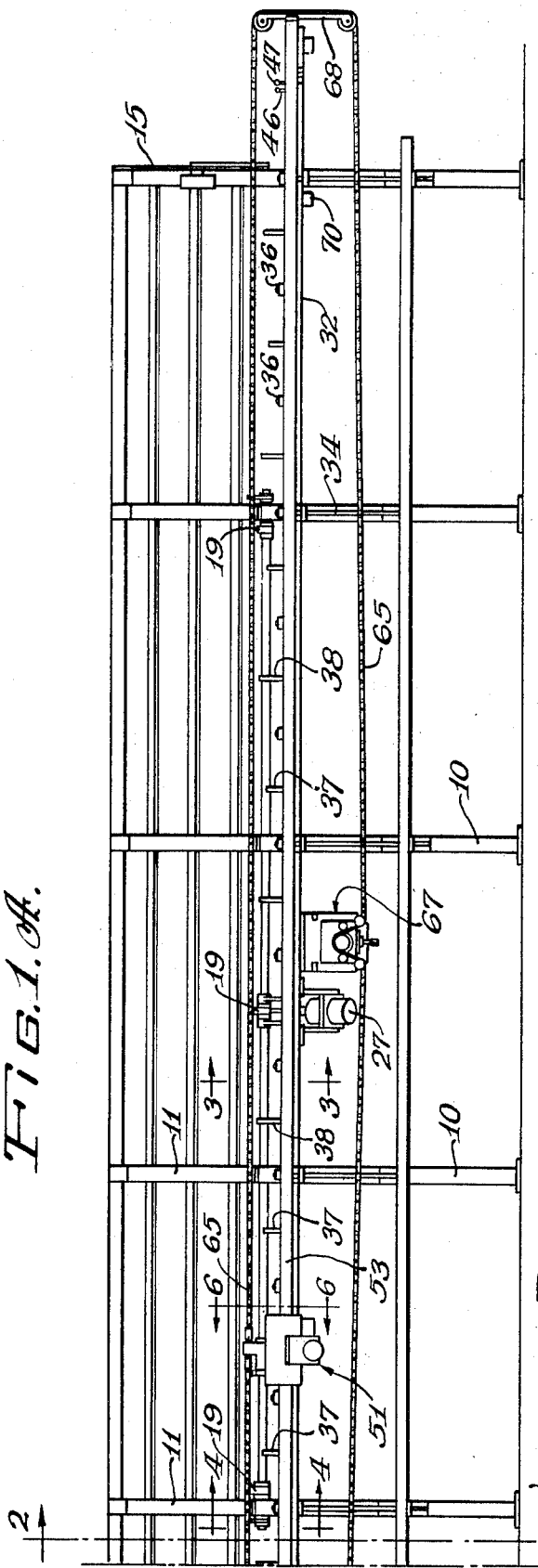
Figure 3:
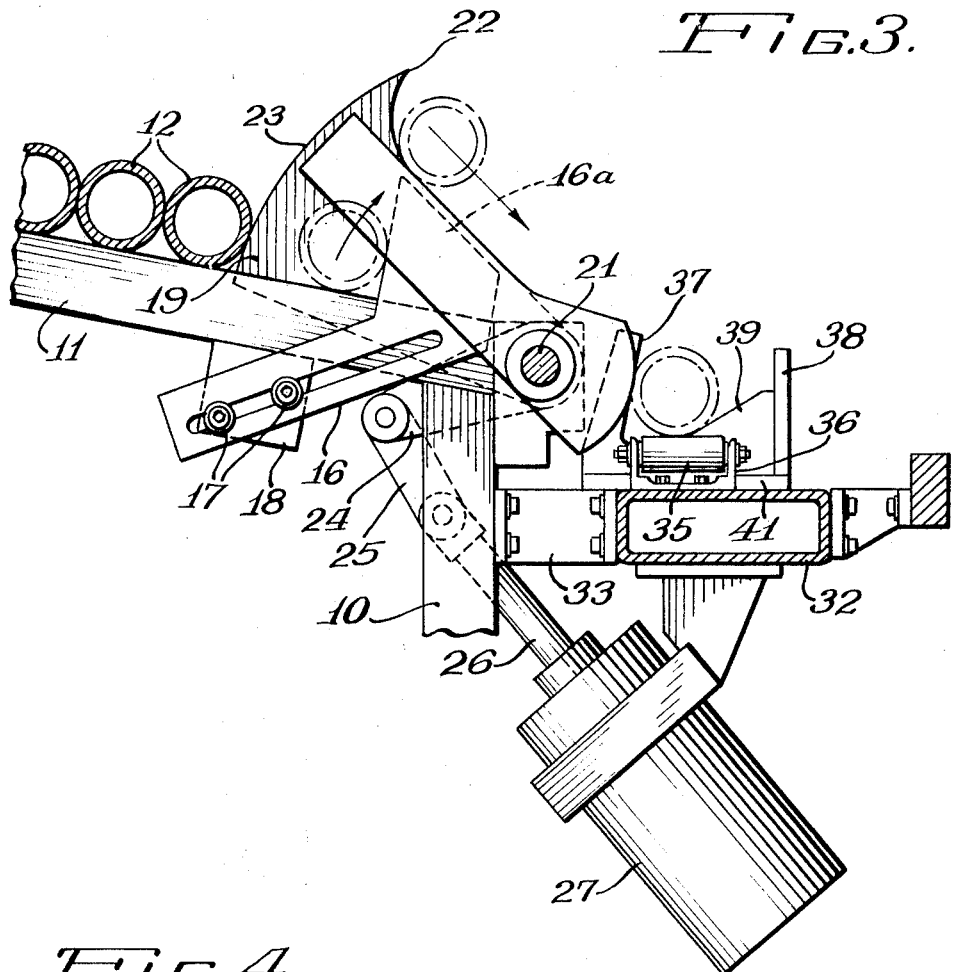
Figure 4:
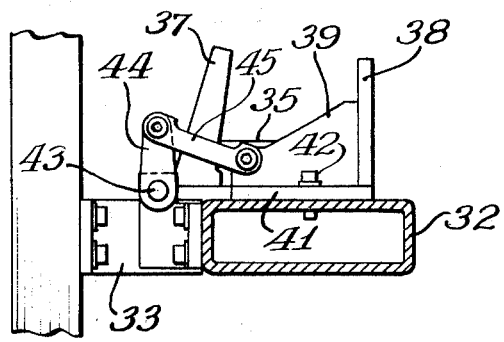
Figure 5:
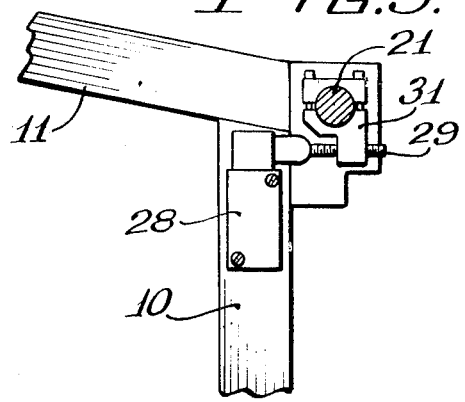
Figure 8:
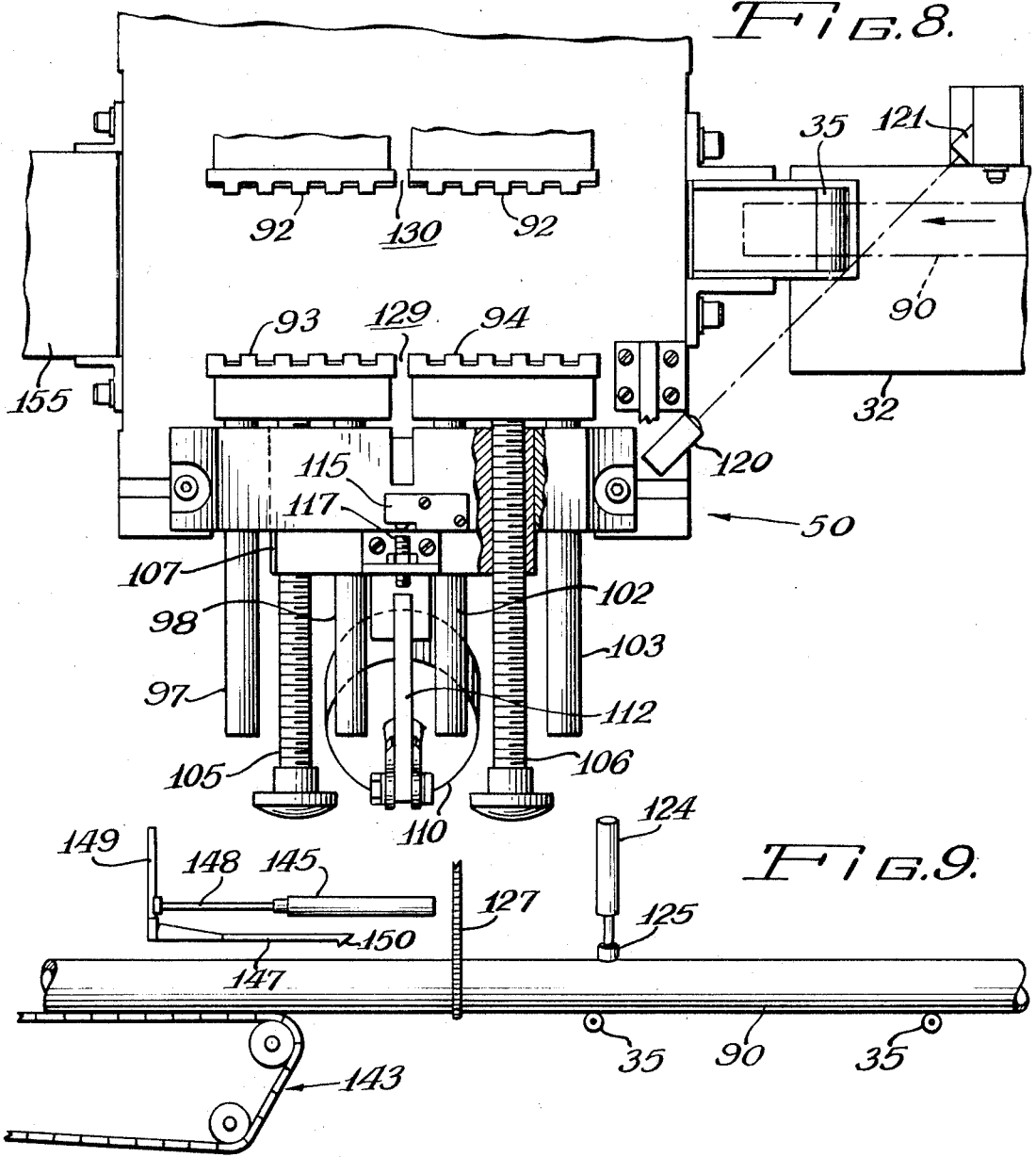
Figure 9:
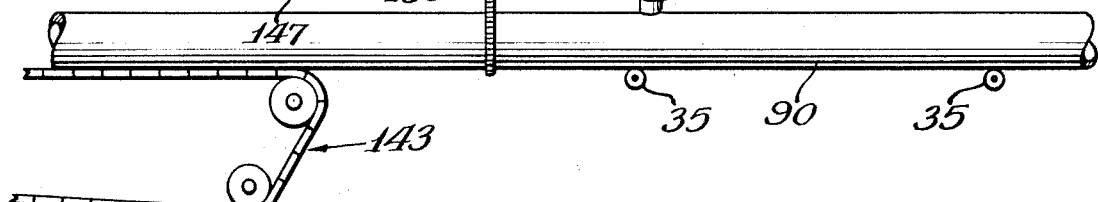
Figure 10:
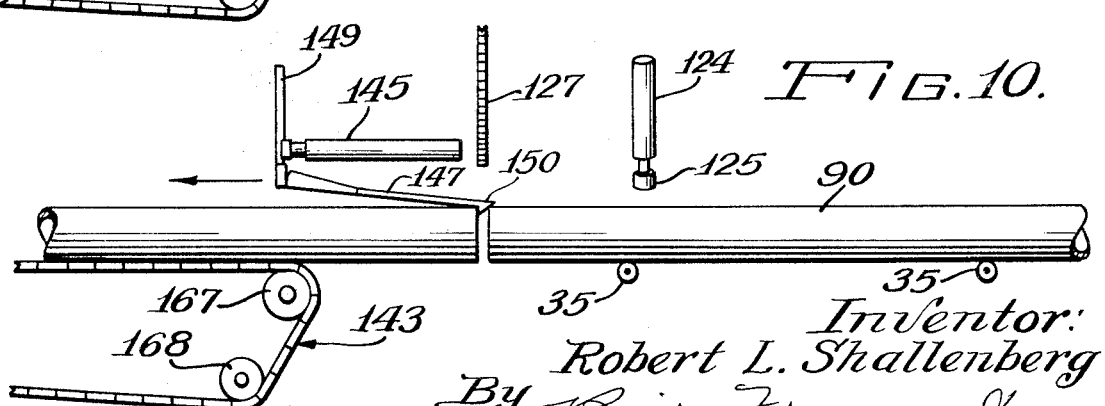

The above and other objects and features of the invention will be more readily apparent from the following description when read in connection with the accompanying drawings, in which:

FIGURES 1 and 1A, taken together, are a side elevation of an automatic cutting machine embodying the invention;
FIGURE 2 is a section on the line 2--2 of FIGURE 1A;
FIGURE 3 is a partial section on the line 3--3 of FIGURE 1A;
FIGURE 4 is a partial section on the line 4--4 of FIGURE 1A;
FIGURE 5 is a sectional detail of a portion of the guide operating mechanism;
FIGURE 6 is a partial section on the line 6--6 of FIGURE 1A;
FIGURE 7 is a bottom view of the pusher mechanism illustrated in FIGURE 6;
FIGURE 8 is a partial plan view of the clamping means at the cutting station;
FIGURES 9 and 10 are diagrammatic views illustrating the discharge mechanism for moving cut pieces from the cutting means to the discharge conveyor;
FIGURE 11 is an end elevation on the line 11-11 of FIGURE 1;
FIGURE 12 is a partial section on the line 12--12 of FIGURE 1;
FIGURE 13 is a section similar to FIGURE 12 showing the parts in a different position;
FIGURE 14 is a partial section on the line 14--14 of FIGURE 1;
FIGURE 15 is a partial plan view of the discharge end of the discharge conveyor with parts broken away and in section;
FIGURE 16 is a partial section on the line 16--16 of FIGURE 15; and
FIGURE 17 is a diagrammatic view of the hydraulic control circuit.

THE STORAGE RACK AND TRANSFER MECHANISM

The storage rack for holding the work pieces and the transfer mechanism for removing work pieces therefrom are best shown in FIGURES 1, 1A, 2 and 3. As there shown, the storage rack comprises a series of upright posts 10 of different lengths which are connected at their tops by downwardly sloping rails 11, on which elongated work pieces such as the pipes 12 illustrated in FIGURE 3 are adapted to rest. The posts 10 may be connected by cross braces 13, and the ends of the rack may be provided with upwardly extending guard rails 15 to locate the work pieces longitudinally on the rack and to prevent them from sliding accidentally off of the ends of the rack. The rack may be made of any desired size to hold any requisite number of work pieces which will tend to roll or slide toward the lower ends of the rails 11, as seen in FIGURE 2, where they may be discharged singly from the rack.

For discharging the work pieces a transfer mechanism, as best seen in FIGURE 3, is provided adjacent to the lower end of the rack. This mechanism comprises a stop member 16 which is preferably adjustably supported by screws 17 on a bracket 18 on the rack and which, as shown, includes a finger portion 16a projecting above the top surfaces of the rails 11 to engage the lowermost work piece on the rack. It will be understood that the stop member 16 is adjusted by loosening and retightening the screws 17 to hold a single work piece in the desired position in which it may be picked up and transferred.

A work piece lying against the stop 16 is adapted to be elevated over the stop and transferred from the storage rack by a series of transfer bars 19. The bars 19, as shown, are secured to and spaced lengthwise of a shaft 21 for simultaneous movement. Each bar 19 is provided with an upper pointed hook portion 22 and with an arcuate end 23. The stop member 16 is so adjusted that the hook portions 22 on the bars 19 will engage just behind the leading work piece and so that the arcuate surface 23 will engage the next work piece on the rack as the bars are raised to prevent the work pieces from moving down the rack.

When the bars are raised to their uppermost position, as shown in FIGURE 3, they will elevate the leading work piece above the upper end of the stop member 16 so that the work piece can roll down the bars and from the storage rack to a supporting and guiding frame, to be described hereinafter. In order to turn the bars the shaft 21 is provided with an arm 24 which is connected through a link 25 to the piston rod 26 of a hydraulic pick cylinder 27. When it is desired to transfer a work piece from the storage rack, the cylinder 27 is extended to the position shown in FIGURE 3 to rock the transfer bars 19 upwardly to the position shown. The upward limit of movement of the bars 19 is controlled by a limit switch 28, shown in FIGURE 5, which is mounted on one of the posts 10 and which is engaged by an adjustable operating screw 29 carried by an arm 31 secured to the shaft 21.

When the screw 29 engages the limit switch 28, the limit switch operates to cut off the supply of actuating fluid to the cylinder 27 so that turning of the shaft 21 and further raising of the transfer bars 19 will be stopped. After the lowermost work piece on the rack has been transferred, as described above, the supply of operating fluid to the cylinder 27 will be reversed to lower the transfer bars 19 to the position shown in FIGURE 2, at which time the work pieces from the rack will move forward until the lowermost work piece engages the stop finger 16a. The work pieces will remain in this position until it is desired to transfer another work piece from the storage rack.

THE SUPPORTING FRAME AND GUIDES

Work pieces transferred from the storage rack are received in an elongated supporting frame extending along the lower edge of the storage rack from the outer end thereof to the cutting means. As shown in FIGURES 1, 1A, 2, 3 and 4, the supporting frame comprises an elongated box beam 32 which may be secured to the forward posts of the storage rack by brackets 33. Angle braces 34, as best seen in FIGURES 1A and 2, may also be provided to assist in supporting the beam 32. On its upper surface the beam 32 carries a series of horizontal rollers 35 which are rotatably supported in U-shaped brackets 36 and upon which a work piece is adapted to rest for free movement lengthwise of the frame. In order to guide a work piece accurately during its movement along the frame, fixed and movable guide members are provided, as best seen in FIGURES 3 and 4. The fixed guide members comprise a series of bars 37 which are secured to the beam 32 and which are preferably laterally adjustable thereon for accurate positioning. Preferably the inner surface of each fixed guide member slopes slightly toward the center of the beam 32, as shown, to correspond to the slope on the fixed clamp jaw to be described hereinafter, and to assist in accurately positioning a work piece.

The movable guide members comprise upwardly extending fingers 38 which are connected by webs 39 extending downwardly toward the center of the beam 32 to a base plate 41 which overlies and may be slidably or fixedly secured to the beam 32 by screws 42. In order to adjust all of the movable guide members simultaneously and to the same degree, a shaft 43 is journalled in the brackets 33 and extends along the side of the beam 32 adjacent to the storage rack. Opposite each of the movable guide members the shaft 43 has an arm 44 secured thereto which is connected through a link 45 to the adjacent movable guide member, as shown in FIGURE 4.

The shaft 43 is adapted to be turned by a manually operable lever 46 secured thereto adjacent to one end of the machine, as show in FIGURE 1A. Preferably a locking means is provided for holding the shaft in adjusted position which may be released by a lever 47 when desired to permit adjustment of the movable guide members. The movable guide members may additionally be locked in adjusted position by tightening certain of the screws 42 after the guide members have been properly adjusted.

The guide members are preferably adjusted to hold a work piece, such as a pipe or rod as shown in dotted lines in FIGURE 3, on the supporting frame. As will be seen in the FIGURE, when a work piece is deposited between the fixed bar 37 and movable guide fingers 38 by the transfer mechanism, it will drop down and rest on the upper sloping surface of the webs 39. The work piece will then roll or move down these webs until it engages the adjacent surface of the fixed guide bars 37 at which position it will be supported on the rollers 35. The work piece is thus enabled to be moved freely along the frame because of its support by the rollers 35, but is at the same time accurately guided by engagement with the fixed guide members 37 and the upper sloping surfaces of the webs 39.

STOCK PUSHER AND MEASUREMENT ASSEMBLY

After a work piece has been transferred from the storage rack to a position atop the rollers 35, it is moved axially toward the cutter assembly indicated generally at 50 in FIGURE 1 by means of a pusher indicated generally at 51 in FIGURES 1A and 2. The pusher 51 is mounted for rolling, translational movement on a horizontal running rail 53. Running rail 53 is mounted parallel with and spaced from box beam 32 by means of a series of brackets 54, one of which is clearly seen in the cross-sectional view of FIGURE 3.

The pusher 51 is supported by two sets of three rollers each. Rollers 56, 57 and 58 are clearly seen in FIGURE 6. Roller 58 provides vertical support for one end of the pusher and bears against the top surface of running rail 53. Rollers 56 and 57 bear against the opposite sidewalls of the running rail 53. The positions of rollers 56 and 57 (as well as their counterparts 56' and 57') are also shown in FIGURE 7, a bottom view of the mechanism depicted in FIGURE 6. The axles upon which these rollers rotate are rigidly affixed to the carriage section 60 of pusher 51. A pusher arm 62 is rigidly affixed to the top of carriage 60 and includes a downwardly extending member 63 which engages with the end of the work piece resting on the rollers 35.

As seen in FIGURES 1 and 1A, the pusher 51 is coupled to and driven by a chain loop 65. There are alternative methods for driving the pusher 51, for example, by hydraulic drive unit or an electric drive mounted directly on the pusher 51. Motive power for the chain loop 65 is supplied by a variable speed drive motor indicated generally at 67 in FIGURE 1A. As the chain loop 65 is driven in a counterclockwise direction as seen in FIGURE 1A, the pusher 51 travels down the running rail 53 pushing the work piece before it toward the cutter 50. By reversing drive motor 67, the pusher is pulled by chain loop 65 from left to right away from cutter 50. The chain 65 is held in a generally rectangular loop by means of sprockets positioned at the end of spreader arm 68 (seen in FIGURE 1) and 69 (seen in FIGURE 1A). Spreader arms 68 and 69 are mounted at the ends of box beam 32.

As seen in FIGURE 1A, a limit switch 70 is mounted on the underside of the box beam 32 at the end of the storage rack farthest from the cutter assembly 50. Switch 70 functions to prevent a work piece from being transferred from the storage rack unless pusher 51 is positioned to the right of switch 70 as shown in FIGURE 1A. Switch 70 opens as pusher 51 moves past it from left to right and is closed as the pusher 51 passes from right to left.

Referring to FIGURES 6 and 7, the switch 70 is mounted on the underside of box beam 32 and includes a U-shaped actuating arm 71. Rollers 73 and 74 are positioned at the ends of U- shaped arm 71, the roller 73 being mounted on the underside of arm 71 while the roller 74 is mounted above arm 71. A pair of L-shaped plates 75 and 76, mounted in vertically spaced relation with respect to one another, engage with the rollers 73 and 74 respectively. With the U-shaped actuating arm positioned as shown in FIGURES 6 and 7, roller 73 is positioned to engage with the inwardly extending arm of L-shaped plate 75 as the pusher 71 passes switch 70. When this occurs, the U-shaped actuating arm 71, and shaft 79 upon which it is mounted, pivot to operate the switch. Roller 74 then moves into alignment with the path of the inwardly extending finger portion of L-shaped member 76, such that, when the pusher 51 again passes the switch 70 in the opposite direction, the U-shaped actuating arm will be returned to the position shown in FIGURES 6 and 7.

An electrical pulse generator mounted within a cylindrical casing 80 is fitted to the carriage section 60. This pulse generator produces a predetermined number of electrical impulses for each unit of translational motion of the carriage 60 with respect to the running rail 53. A driven roller 81 is mounted at the extended end of a shaft 82 journalled in the casing 80. A drive roller 83 engages with the driven roller 81 and with the underside of the running rail 53 so that, as the carriage 60 moves down the rail 53, driving roller 83 rotates the driven roller 81 and the shaft 82. Rotation of the shaft 82 produces electrical impulses (typically, 1000 pulses for each inch of movement of the carriage 60). By monitoring these impulses, it is possible to accurately measure the movement of pusher 51 and hence the movement of the work piece over the rollers 35. The manner in which these impulses are produced and utilized will be discussed in more detail below.

The work piece to be cut (indicated in phantom at FIGURE 8 at 90) moves down the rollers 35 to the cutter assembly shown generally at 50. Work piece 90 moves between a first pair of fixed clamping jaws 92 and a second pair of hydraulically operated, movable clamping jaws 93 and 94.

The movable jaws 93 and 94 are independently adjustable. The jaw 93 is rigidly attached to a pair of guide rods 97 and 98 which are slidably received in bores through a stationary block 100. Similarly, jaw 94 is attached to guide rods 102 and 103 which pass through bores in the fixed block 100. Threaded adjustment rods 105 and 106, both of which pass through threaded bores in a slide block 107, are attached to the movable clamping jaw 93 and 94 respectively. By rotating the adjustment rod 105, the position of clamping jaw 93 with respect to the slide block 107 may be adjusted. Likewise, rotation of the threaded adjustment rod 106 adjusts the position of clamp jaw 94 with respect to the slide block 107.

A hydraulic clamp cylinder 110 is coupled to the slide block 107 by means of a bell crank 112. Thus, when the cylinder 110 is actuated, the bell crank 112 pivots to move the slide block 107 (and hence the clamping jaws 93 and 94) with respect to the fixed block 100 and the fixed clamping jaws 92.

Because the work piece 90 is directed between the jaws in a very accurately aligned manner, the clamping jaws 93 and 94 need to open away from the fixed jaws 92 only by a very slight distance in order to provide an adequate entry for the next work piece.

To prevent the jaws 93 and 94 from fully closing when no work piece is inserted (and thus endangering the safety of the workmen operating the machine), a limit switch 115 affixed to the top of fixed block 100 is adapted to deactivate cylinder 110 after the sliding block 106 has travelled a predetermined distance such that the adjustable screw 117 engages the switch button on limit switch 115.

As seen in FIGURE 8, the cutting mechanism also incorporates an electric eye mechanism comprising a light source 120 and a photodetector 121. Light source 120 is mounted to direct a beam of light toward the photodetector 121 along a path which intersects the path of the moving work piece 90. Photodetector 121 accordingly delivers a signal which indicates the moment at which a work piece 90 has reached the vicinity of the cutter assembly 50. When the cutter assembly 50 is in operation, the light signal will be continuously interrupted. However, when the stock on the storage rack has been depleted and cut to programmed lengths, the light signal will activate the photodetector 121. This, in turn, causes the conveyor feed assembly to cease operations until the system is reactivated and additional stock is placed in the rack.

As the work piece 90 illustrated in FIGURE 9 is guided through the cutter assembly 50 along the rollers 35, the brake cylinder 124 causes the brake 125 to engage the work piece 90. The brake 125 engages the work piece 90 at a pressure sufficient to prevent the work piece 90 from overriding or continuing to roll on the rollers 35 once the drive motor 67 has ceased to operate and drive the work piece 90 forward in the direction indicated by the arrow. In addition to the brake mechanism which prevents overriding, the pulse counter prevents overriding by sensing the driven length of the work piece 90. Thus when a set measured length of work piece has almost traversed the appropriate distance, the pulse counter de-energizes the variable speed motor 67 in graduated steps until the motor stops when the appropriate length is measured. The cooperation of the brake 125 and the gradual slowing down of the variable speed motor 67 assure that there will be no overriding and that the work piece is properly positioned for cutting.

THE CUTTING ASSEMBLY

FIGURES 1, 9 and 10 illustrate the cutting assembly 50. In FIGURES 9 and 10 the components of the assembly have been omitted except for a new blade 127. After a proper length of the work piece has been measured off and locked into position by the jaws 92, 93 and 94, the saw blade 127 automatically lowers and cuts through the work piece 90. In FIGURE 8 the slots 129 and 130 between the movable jaws 93 and 94 and the fixed jaws 92 permit the saw blade 127 to be lowered and cut the work piece without interfering with the jaws. After the work piece has been cut, the saw blade 127 automatically raises to its original position.

FIGURE 1 more clearly illustrates the components of the cutting assembly 50. The saw blade and motor drive may be any of a number of types known in the art and adapted for use with the invention. The cutting assembly generally shown at 50 is comprised of a power blade drive motor in a mounting carriage housing 134. The housing 134 is freely movable in a vertical plane along the guide bars 136 and 137. The vertical height or position of the housing 134 and saw blade 127 may be adjusted by turning threaded adjusting bars (not shown) in a manner and construction which are similar to that previously described in conjunction with the slide block 107. The cutter assembly 50 is raised and lowered by the hydraulically actuated cutter cylinder 139. When the saw blade 127 begins rotation the cutter cylinder 139 is actuated to lower the cutter assembly 50 to cut the work piece (not shown in FIG. 1). After the work piece is cut, the cutter assembly 50 is raised by the cutter cylinder 139 until a projection on the housing 134 trips a limit switch 141 and turns off the saw blade motor.

THE DISCHARGE MECHANISM AND CONVEYOR

The next operation is particularly illustrated by FIGURES 1, 9 and 10, and in addition reference will be made to FIGURE 16. After the work piece has been cut, and the saw blade 127 raised from the slot defined by the cut between the sections of work piece, the newly cut portion of the work piece 90 (the left hand portions in FIGS. 9 and 10) is positioned on a conveyor generally shown at 143 and distributed to a bin in a manner to be described more fully below.

If the newly cut work piece portion is relatively long, it will be initially positioned on and carried by the conveyor 143 which is activated subsequent to the cutting operation. On the other hand, rather short pieces will be pushed onto the conveyor 143 as the work piece 90 is again fed underneath the saw blade 127. There are circumstances, however, when certain cut off lengths will not be properly positioned on the conveyor. For example, when a short piece is advanced for only a short distance it may not come to rest on the conveyor 143. Thus there is provided an eject cylinder 145 which actuates an eject arm 147 to position the newly cut work piece on the conveyor 143.

Generally the shaft 148 of the eject cylinder 145 is in the position illustrated in FIGURE 9. Attached at the end of the shaft is a vertical bar 149 which may be fixed in a raised or lowered position in order to simultaneously raise or lower the eject arm 147. The eject arm 147 is hinged to the lower part of the vertical bar 149 and spring biased toward the work piece 90. A stop (not shown) is provided on the vertical bar to engage and limit the downward extent of travel of the biased eject arm 147. The end of the eject arm has a pointed finger 150 with an inclined surface which insures that the eject arm 147 will generally be guided up and ride on top of the work piece 90.

After the saw cut has been made the eject cylinder 145 forces the eject arm 147 into the position illustrated in FIGURE 10. There the hooked end of the finger 150 falls into the slot resulting from the saw cut and hooks over the end of the newly cut work piece. The shaft 148 of the eject cylinder 145 is then extended driving the newly cut work piece onto the conveyor 143. As previously pointed out, the vertical bar 149 is adjustable to accomodate variously sized work pieces and insure that the finger portion 150 will be adjusted to a height at which it will ride up on top of a newly inserted work piece yet still be able to fall down into the slot created by the saw blade 127.

CONVEYOR AND PUSH OFF ASSEMBLY

The conveyor assembly, onto which the newly cut work piece is directed by the eject arm 147, is supported by upright members 151 as illustrated in FIGS. 1 and 11, for example. The upright members 151 each rest on a pad 152 and are supported by a brace 153 between the upright member 151 and an extended portion of the pad 152.

Referring now to FIGS. 1 and 11 through 16, a channeled box beam 155 extends in a straight line from the cutting assembly 50, previously described, and rests substantially atop the upright members 151. The box beam 155 has a channel 156 extending along the top of the beam for the length of the beam 155. The box beam 155 is supported on its opposite sides by longitudinal support members 157 and 158 which run the length of the box beam 155 and extend beyond the length of the conveyor 143 as illustrated in FIGURE 15. The support members 157 and 158 serve to attach the box beam 155 to the upright members 151.

The conveyor 143, which is comprised of a link chain 163 with plates 164 attached around the outer circumference of the chain 163, is partially inserted and guided by the channel 156. The conveyor 143 forms a closed loop which, in addition to being guided by a channel 156, is guided by the adjustable sprocketed wheels 165 through 168 and the non-sprocketed wheel 169. The sprocketed wheel 166 also acts as the drive wheel, being driven by a pulley 168 which interconnects a motor drive pulley 171 to a pulley which has a common shaft with the drive wheel sprocket 166. The motor pulley 160 is driven by the electric motor 170. The motor 170 is mounted by appropriate bracing means on the upright members 151 positioned at the end of the conveyor assembly. The drive belt 160 is protected by a metal shroud 172.

A gap exists between the end of the conveyor 143 and a limit switch assembly 162. This gap provides an area into which scrap pieces are transported by the conveyor 143. The short pieces drop off the end of the conveyor 143 without activating the limit switch assembly 162 and without turning off the conveyor 143.

Normally as the work piece is conveyed along the conveyor assembly it ultimately may engage the biased plate 174 and thereby activate limit switch 173 of the limit switch assembly 162. The activated limit switch 173 stops the conveyor drive motor 170 thereby stopping the movement of the conveyor 143. Thus after an appropriate length of a work piece is measured and cut, it is conveyed until it engages the plate 174. The conveyor 143 then stops and the cut off work piece is dumped to the side of the conveyor 143 as described below.

Referring now especially to FIGURES 12, 13, and 14, there is provided over the conveyor 143 a three sided channel beam 176. The beam 176 is suspended by guides 178 through 180 which ride on rails 182 through 184 respectively. A hydraulic stock dump cylinder 186 having a drive rod 187 which is connected to the channel beam 176 drives the channel beam 176 from a position over the conveyor 143 to a second position parallel to the side of the conveyor as illustrated in FIG. 13. The stock dump cylinder 186 is appropriately mounted on a plate 188 attached at the side of the channel box beam 155 and held in position by the brace 189 connected to the plate 188. The brace 189 extends from the plate 183 to the end of the stock dump cylinder 186.

Upright members 191 through 194, which are attached to the side of the conveyor assembly common with the plate 188, are interconnected by a cross member 195. The rails 182 through 184 are connected from the cross member 195 to a second parallel cross member 197. The second cross member 197 being longer than the first cross member 195 is attached by appropriate bracing members 196 and 198 at its ends to the conveyor assembly. The rails 182 through 184 provide support for the channel beam 176 which is also guided by the rails 182 through 184. A limit switch 199 actuated by the adjustable switch screw 200 reverses the direction of movement of the channel beam 176 along the rails 182 through 184 by sending an appropriate signal to the stock dump cylinder 186.

An alternate stock dump cylinder 202 is pivotally connected by a link 204 to a shaft 206 which runs the length and parallel to the conveyor assembly. The shaft 206 is attached to a flat work piece guide plate 208. The plate 208 is normally inclined with one side terminating on the shaft 206 and the other side terminating adjacent the conveyor belt 143. Thus, when the channel beam 176 is moved from over the conveyor 143 thereby also moving a work piece from the conveyor belt 143, the plate 208 guides the work piece (for example as shown in FIG. 13) toward a bin which is positioned below and to the left of the conveyor assembly as shown in FIGS. 12 through 14.

On the other hand, if the alternate cylinder 202 is actuated, the plate 208 is driven by cylinder 202 in the counterclockwise direction from the position shown in FIGS. 12 through 14 to permit a work piece to be discharged directly beneath the conveyor assembly. The direction plate 208 moves is directed by an arrow in FIG. 14.

The alternate cylinder 202 is programmed to be actuated when the length of work piece which has been cut off is an incorrect short length. For example, when the end piece length of the uncut work piece is not equal to the set programmed length, the alternate cylinder 202 is automatically actuated. The plate 208 is thus rotated counterclockwise to direct the work piece into an alternate storage bin (not shown) so that the short work piece will not be mixed in with work pieces of the appropriate length.

THE CONTROL CIRCUITRY AND OPERATIONS SEQUENCE

The sequence of operations of the cutting machine is illustrated by reference to FIG. 1 and especially FIG. 17. The cutting machine operations are selected and controlled by the control components which, for the most part, are housed in the cabinet 210. Power and control lines 211 and 212 lead from the cabinet 210 to the cutting machine itself.

Referring now to FIG. 17, a diagrammatic illustration of the pneumatic circuitry for the cutting machine, one may understand more clearly the sequence of operations of the cutting machine. The air direction flow is indicated by the arrows with the double headed arrows indicating flow direction in either of two directions depending upon the sequence of the operation. An air supply is provided into the filter 214, regulator 215, and lubricator 216 at approximately 125 pounds per square inch and at a rate of approximately 100 cubic feet per minute.

After stock is loaded on the storage rack and the cutting machine is activated, the first step is the energization of solenoid 218. This shifts the spool in the valve 219 to direct air to the head end of the pick cylinder 27 for picking up a single piece of stock and depositing it onto the feed assembly. Next the solenoid 218 de-energizes and shifts the spool in the valve 219 to direct air to the rod end of the pick cylinder 27. The stock picker is thus returned to the start position. Flow control valves 220 and 221 are provided to control the pick cylinder operating speed.

In the next step an appropriate length of work piece is measured off as previously described by the pulse counter. Then solenoid 222 energizes and shifts the spool in valve 223 to direct the head end of the brake cylinder 124 thus extending the work piece brake 125 into engagement with the work piece to prevent overriding as previously described. Flow control valve 224 controls the cylinder operating speed of the brake cylinder 124 as the brake cylinder 124 is driven into engagement with the work piece.

After an appropriate length of the work piece has been measured by the pulse counter, solenoid 225 energizes to cause valve 226 to direct air to the head end of the clamp cylinder 110 for clamping the work piece. The regulator 227 controls the clamp pressure on the work piece due to the clamp cylinder 110.

Next, solenoid 228 energizes, causing the valve 229 to direct air into the head end of the cutter cylinder 139 thus bringing the head end down and causing the saw blade 127 to cut the work piece in the manner previously described. Following this the solenoid 228 de-energizes, causing the valve 229 to shift and direct air to the rod end of the cutter cylinder 139 thereby causing the cutting head to rise with the saw blade 127.

Solenoid 231 then energizes and causes valve 226 to direct pressurized air to the rod end of the clamp cylinder 110 thereby opening the clamps. Solenoid 223 may likewise de-energize to at least partially permit the brake cylinder 124 to disengage the brake 125 from the work piece.

In the next step, solenoid 233 is energized, causing the valve 234 to direct air to the rod end of the eject cylinder 145 thereby sending the stock eject arm 147 as previously described into engagement with the work piece. Then the solenoid 233 de-energizes causing the valve 234 to direct air into the head end of the eject cylinder 145 thereby ejecting the work piece onto the conveyor 143. Flow control valves 235 and 236 control the operating speed of the eject cylinder 145.

If the length of the work piece is shorter than the desired length which was initially set on the control cabinet, then the solenoid 238 energizes and causes the valve 239 to direct air to the rod end of the alternate stock dump cylinder 202. This, in turn, opens the alternate stock dump gate or plate 208 as previously described. Next solenoid 233 energizes causing valve 234 to direct air to the head end of stock dump cylinder 186. This causes stock to be carried from the conveyor 143 as previously described. Then solenoid 243 de-energizes causing valve 244 to direct air to the right end of cylinder 186 thus returning the stock dump cylinder to its original starting position over the conveyor 143. Flow control valves 240 and 241 are provided for the alternate stock dump cylinder 202, and flow control valves 245 and 246 are provided for the stock dump cylinder 186.

Next solenoid 238 de-energizes causing valve 239 to direct air to the head end of the alternate stock dump cylinder 202 thereby closing the alternate stock dump gate 208. Of course, if the work piece is cut off at the properly measured length, the alternate stock dump sequence is not initiated.

When a length of work piece has been cut into the preset lengths, solenoid 222 de-energizes causing valve 223 to direct air to the rod end of the brake cylinder 124, thereby fully releasing the stock brake so that the sequence of operations may again begin. Of course, the electrically driven components such as the stock pusher, the saw blade, and the conveyor are initiated at the proper times in the sequence of operations. For example, the saw blade 127 begins cutting rotation when the solenoid 228 is first activated.

I claim:

1. An automatic cutting machine comprising an elongated frame to support an elongated work piece, cutting means adjacent to one end of the frame to cut a work piece, means to feed a work piece on the frame lengthwise along the frame to a desired position relative to the cutting means, a controller for the feeding means and cutting means, means responsive to the movement of the feeding means to cause the controller to operate a predetermined distance ahead of the end of said desired position to reduce the rate of movement of the feeding means and to stop the feeding means and initiate operation of the cutting means, a brake to engage a work piece moving toward the cutting means, means operable simultaneously with reduction of speed of the feeding means to apply said brake and means operable at the end of a cutting operation to restart the feeding means.

2. An automatic cutting machine comprising an elongated frame to support an elongated work piece, cutting means adjacent to one end of the frame to cut a work piece, means to feed a work piece on the frame lengthwise along the frame to a desired position relative to the cutting means, a controller for the feeding means and cutting means, means responsive to movement of the feeding means to cause the controller to operate after a predetermined movement of the feeding means to stop the feeding means and initate operation of the cutting means, clamps operated by the controller to clamp a work piece adjacent to the cutting means when the feeding means is stopped, and a brake member engageable with the work piece at one side thereof to brake movement of the work piece and to press the work piece to a predetermined position relative to the clamps and means operable at the end of a cutting operation to restart the feeding means.

3. The machine of Claim 2 in which the clamps comprise two pairs of jaws, one on each side of the cutting means and spaced for movement of the cutting means between them to cut the work piece.

4. The machine of Claim 2 in which the clamps comprise a fixed vertical jaw and a horizontally movable vertical jaw both overlying a horizontal support and in which the brake member presses the work piece into the angle between the fixed jaw and the support.

5. The machine of Claim 1 including a fixed clamp jaw and a movable clamp jaw to grip a work piece adjacent to the cutting means, power means to move the movable jaw through a fixed distance, means to adjust the movable jaw relative to the power means, and control means to prevent operation of the cutting means except when the jaws are moved together.

6. An automatic cutting machine comprising an elongated frame to support an elongated work piece cutting means adjacent to one end of the frame to cut a work piece, work feed means including a pusher engageable with the end of the work piece to move the work piece along the frame toward and past the cutting means to a desired position relative to the cutting means, a controller for the feeding means and cutting means, means responsive to movement of the feeding means to cause the controller to operate after a predetermined movement of the feeding means to stop the feeding means and initiate operation of the cutting means, control means operated by the pusher at the limit of its movement toward the cutting means to reverse the movement of the pusher, means to supply a new work piece to the frame, control means operated by the pusher as it approaches the limit of its reverse movement to cause the supply means to operate, and control means operated by the pusher to prevent the operation of the supply means except when the pusher is adjacent to the limit of its reverse movement.

7. The machine of Claim 6 including cooperating means on the frame and the pusher to generate signals indicative of the movement of the pusher and which are transmitted to the controller.

8. An automatic cutting machine comprising an elongated frame to support an elongated work piece having fixed guide members to engage one side of said work piece, moveable guide members moveable toward and away from the opposite side of the work piece, said guide members including upper surfaces sloping downwardly toward the fixed guide members to direct said work piece toward and into engagement with the fixed guide members, a shaft extending along the frame, connections between the shaft and the moveable guide members, means to turn the shaft to adjust all the moveable guide members simultaneously, cutting means adjacent to one end of said frame to cut said work piece, means to feed a work piece on the frame lengthwise along the frame to a desired position relative to the cutting means, a controller for the feeding means and cutting means, means responsive to the movement of the feeding means to cause the controller to operate after a predetermined movement of the feeding means to stop the feeding means and initiate operation of the cutting means and means operable at the end of a cutting operation to restart the feeding means.

9. The machine of Claim 8 including a rack to hold a supply of work pieces, and transfer mechanism to pick a single work piece from the rack and drop it downwardly onto the frame between the fixed and movable guide members.

10. The machine of Claim 1 including means to sense when the end of a work piece moving toward the cutting means is a predetermined distance from the cutting means and to set the controller to cause the feeding means to move the work pieces a further distance slightly greater than said predetermined distance.

11. An automatic cutting machine comprising an elongated frame to support an elongated work piece, cutting means adjacent to one end of the frame to cut a work piece, means to feed a work piece on the frame lengthwise along the frame to a desired position relative to the cutting means, a controller for the feeding means and cutting means, means responsive to the movement of the feeding means to cause the controller to operate after a predetermined movement of the feeding means to stop the feeding means and initiate operation of the cutting means, a discharge device moveable lengthwise of a work piece having means thereon to engage a work piece which has been cut by the cutting means, control means operated by cutting means at the end of a cutting operation to operate the discharge device to engage a cut portion of the work piece and move it away from the cutting means, and means operable at the end of a cutting operation to restart the feeding means.

12. The machine of Claim 11 in which the discharge device comprises a linearly movable power device and an arm pivoted to the power device and having a hook thereon engageable with the cut end of a work piece which has been cut by the cutting means.

13. The machine of Claim 11 including a conveyor to receive and carry away cut work pieces moved away from the cutting means by the discharge device.

14. The machine of Claim 1 including clamps having two pairs of jaws, one on each side of the cutting means and spaced for movement of the cutting means between said jaws to cut the work piece, said clamps operable by the controller to clamp a work piece adjacent to the cutting means when the feed means is stopped, and a brake member engageable with the feed means at one side thereof to brake movement of the work piece and to press the work piece to a predetermined position relative to the clamps.

15. The machine of Claim 14 in which the clamps comprise a fixed vertical jaw and a horizontally movable vertical jaw both overlying a horizontal support and in which the brake member presses the work piece into the angle between the fixed jaw and the support.

16. The machine of Claim 6 including clamps having two pairs of jaws, one on each of the cutting means and spaced for movement of the cutting means between them to cut the work piece, said clamps operable by the controller to clamp a work piece adjacent to the cutting means when the feeding means have stopped, and a brake member engageable with the work piece at one side thereof to brake movement of the work piece and to press the work piece to a predetermined position relative to the clamps.

17. A machine of Claim 16 in which the clamps comprise a fixed vertical jaw and a horizontally moveable vertical jaw both overlying a horizontal support and in which the brake member presses the work piece into the angle between the fixed jaw and the support.

18. The machine of Claim 11 including clamps having two pairs of jaws, one on each side of the cutting means and spaced for movement of the cutting means between them to cut the work piece, said clamps operable by the controller to clamp a work piece adjacent to the cutting means when the feeding means have stopped, and a brake member engageable with the feed means at one side thereof to brake movement of the work piece and to press the work piece to a predetermined position relative to the clamps.

19. The machine of Claim 18 in which the clamps comprise a fixed vertical jaw and a horizontally movable vertical jaw both overlying a horizontal support and in which the brake member pressed the work piece into the angle between the fixed jaw and the support.

20. The machine of Claim 2 wherein said clamps comprise a fixed clamp jaw and a movable clamp jaw to grip a work piece adjacent to the cutting means including power means to move the movable jaw through a fixed distance, means to adjust the movable jaw relative to the power means, and control means to prevent operation of the cutting means except when the jaws are moved together.

21. The machine of Claim 6 including a fixed clamp jaw and a movable clamp jaw to grip a work piece adjacent to the cutting means, power means to move the movable jaw through a fixed distance, means to adjust the movable jaw relative to the power means, and control means to prevent operation of the cutting means except when the jaws are moved together.

22. The machine of Claim 8 including clamps having two pairs of jaws, one on each side of the cutting means and spaced for movement of the cutting means between them to cut the work piece, said clamps operable by the controller to clamp a work piece adjacent to the cutting means when the feeding means is stopped, and a brake member engageable with the feed means at one side thereof to brake movement of the work piece and to press the work piece to a predetermined position relative to the clamps.

23. The machine of Claim 22 in which the clamps comprise a fixed vertical jaw and a horizontally movable vertical jaw both overlying a horizontal support and in which the brake member presses the work piece into the angle between the fixed jaw and the support.

24. The machine of Claim 8 including a fixed clamp jaw and a movable clamp jaw to grip a work piece adjacent to the cutting means, power means to move the movable jaw through a fixed distance, means to adjust the movable jaw relative to the power means, and control means to prevent operation of the cutting means except when the jaws are moved together.

25. The machine of Claim 1 including cooperating means on the frame and the feeding means to generate signals indicative of the movement of the feeding means which are transmitted to the controller.

26. The machine of Claim 2 including cooperating means on the frame and the feeding means to generate signals indicative of the movement of the feeding means and which are transmitted to the controller.

27. The machine of Claim 8 including cooperating means on the frame and the feeding means to generate signals indicative of the movement of the feeding means and which are transmitted to the controller.

28. The machine of Claim 11 including cooperating means on the frame and the feeding means to generate signals indicative of the movement of the feeding means and which are transmitted to the controller.

29. The machine of Claim 2 in which the frame carries fixed guide members to engage one side of a work piece, movable guide members movable toward and away from the opposite side of the work piece, a shaft extending along the frame, connections between the shaft and the movable guide members, and means to turn the shaft to adjust all of the movable guide members simultaneously.

30. The machine of Claim 29 including a series of rollers on the support frame to support a work piece or lengthwise movement and in which the movable guide members include upper surfaces sloping downwardly toward the fixed guide members to direct a work piece toward and into engagement with the fixed guide member.

31. The machine of Claim 30 including a rack to hold a supply of work pieces, and transfer mechanism to pick up a single work piece from the rack and drop it downwardly onto the frame between the fixed and movable guide members.

32. The machine of Claim 6 in which the frame carries fixed guide members to engage one side of a work piece, movable guide members movable toward and away from the opposite side of the work piece, a shaft extending along the frame, connections between the shaft and the movable guide members, and means to turn the shaft to adjust all of the movable guide members simultaneously.

33. The machine of Claim 32 including a series of rollers on the frame to support a work piece for lengthwise movement and in which the movable guide members include upper surfaces sloping downwardly toward the fixed guide members to direct a work piece toward and into engagement with the fixed guide members.

34. The machine of Claim 33 including a rack to hold a supply of work pieces, and transfer mechanism to pick up a single work piece from the rack and drop it downwardly onto the frame between the fixed and movable guide members.

35. The machine of Claim 11 in which the frame carries fixed guide members to engage one side of a work piece, movable guide members movable toward and away from the opposite side of the work piece, a shaft extending along the frame, connections between the shaft and the movable guide members and means to turn the shaft to adjust all of the movable guide members simultaneously.

36. The machine of Claim 35 including a series of rollers on the frame to support a work piece for lengthwise movement in which the movable guide members include upper surfaces sloping downwardly toward the fixed guide members to direct a work piece toward and into engagement with the fixed guide members.

37. The machine of Claim 36 including a rack to hold a supply of work pieces, a transfer mechanism to pick up a single work piece from the rack and drop it downwardly onto the frame between the fixed and movable guide members.

38. The machine of Claim 2 including means to sense when the end of the work piece moving toward the cutting means is a predetermined distance from the cutting means and to set the controller to cause the feeding means to move the work piece a further distance slightly greater than said predetermined distance.

39. The machine of Claim 6 including means to sense when the end of a work piece moving toward the cutting means is a predetermined distance from the cutting means and to set the controller to cause the feeding means to move the work pieces a further distance slightly greater than the predetermined distance.

40. The machine of Claim 8 including means to sense when the end of a work piece moving toward the cutting means is a predetermined distance from the cutting means and to set the controller to cause the feeding means to move the work pieces a further distance slightly greater than the predetermined distance.

41. The machine of Claim 11 including means to sense when the end of a work piece moving toward the cutting means is a predetermined distance from the cutting means and to set the controller to cause the feeding means to move the work pieces a further distance slightly greater than the predetermined distance.

42. The machine of Claim 1 including a discharge device movable lengthwise of a work piece having a linearly movable power device and an arm pivoted to the power device, a hook thereon engagable with the cut end of a work piece which has been cut by the cutting means, and control means operated by the cutting means at the end of a cutting operation to operate the discharge device to engage a cut portion of the work piece and move it away from the cutting means.

43. The machine of Claim 2 including a discharge device movable lengthwise of a work piece having a linearly movable power device and an arm pivoted to the power device, a hook thereon engageable with the cut end of a work piece which has been cut by the cutting operation to cut the discharge device to engage a cut portion of the work piece and move it away from the cutter.

44. The machine of Claim 6 including a discharge device movable lengthwise of a work piece and having the linearly movable power device and an arm pivoted to the power device, a hook thereon engageable with the cut end of the work piece which has been cut by the cutting means, and control means operated by the cutting means at the end of a cutting position to operate a discharge device to engage a cut portion of the work piece and move it away from the cutting means.

45. The machine of Claim 8 including a discharge device movable lengthwise and a work piece and having a linearly movable power device and an arm pivoted to the power device, a hook thereon engageable with the cut end of the work piece which has been cut by the cutting means, and control means operated by the cutting means at the end of the cutting operation to operate the discharge device to engage a cut portion of the work piece and move it away from the cutting means.

46. The machine of Claim 1 including means for discharging a cut portion of the work piece and a conveyor to receive and carry away cut work pieces moved away from the cutting means by the means for discharging.

47. The machine of Claim 2 including means for discharging a cut portion of the work piece and a conveyor to receive and carry away cut work pieces moved away from the cutting means by the discharge means.

48. The machine of Claim 6 including means for discharging a cut portion of the work piece and a conveyor to receive and carry away cut work pieces moved away from the cutting means by the discharge means.

49. The machine of Claim 8 including means for discharging a cut portion of the work piece and a conveyor to receive and carry away cut work pieces moved away from the cutting means by the discharge means.